United States Patent
Tsao et al.

(10) Patent No.: US 10,875,464 B1
(45) Date of Patent: Dec. 29, 2020

(54) VEHICLE SEAT AND QUICK-RELEASE SUPPORTING DEVICE THEREOF

(71) Applicant: JET OPTOELECTRONICS CO., LTD., Taipei (TW)

(72) Inventors: Szu-Han Tsao, Taipei (TW); Ching-Hsing Lin, Taipei (TW)

(73) Assignee: JET OPTOELECTRONICS CO., LTD., Taipei (TW)

( * ) Notice: Subject to any disclaimer, the term of this patent is extended or adjusted under 35 U.S.C. 154(b) by 0 days.

(21) Appl. No.: 16/684,381

(22) Filed: Nov. 14, 2019

(51) Int. Cl.
*B60N 2/882* (2018.01)
*B60R 11/00* (2006.01)
*B60N 2/879* (2018.01)
*F16M 11/04* (2006.01)

(52) U.S. Cl.
CPC .............. *B60R 11/00* (2013.01); *B60N 2/879* (2018.02); *B60N 2/882* (2018.02); *F16M 11/04* (2013.01); *B60R 2011/0015* (2013.01); *B60R 2011/0017* (2013.01)

(58) Field of Classification Search
CPC .... B60R 2011/0015; B60R 2011/0017; B60N 2/882; B60N 2/879; B64D 11/00152
See application file for complete search history.

(56) References Cited

U.S. PATENT DOCUMENTS

| 7,070,237 | B2 * | 7/2006 | Rochel | B60R 11/0235 248/118 |
| 7,111,814 | B1 * | 9/2006 | Newman | B60R 11/0211 248/274.1 |
| 10,160,362 | B2 * | 12/2018 | Harris | B60N 2/815 |
| 2002/0175254 | A1 * | 11/2002 | Lee | B60R 11/0235 248/289.11 |
| 2006/0032996 | A1 * | 2/2006 | Wu | B60N 3/004 248/218.4 |
| 2008/0165293 | A1 * | 7/2008 | Tranchina | B60R 11/0235 348/837 |
| 2009/0174238 | A1 * | 7/2009 | Kuno | B60R 11/0235 297/217.3 |

(Continued)

FOREIGN PATENT DOCUMENTS

| DE | 102009030891 A1 * | 2/2010 | | B60R 7/082 |
| DE | 102010006261 A1 * | 8/2011 | | B60R 11/0252 |

(Continued)

*Primary Examiner* — Timothy J Brindley
(74) *Attorney, Agent, or Firm* — Li & Cai Intellectual Property (USA) Office

(57) ABSTRACT

A vehicle seat and a quick-release supporting device thereof are provided. The quick-release supporting device includes a limiting member, a carrier, and two engaging structures. The carrier is fastened to the limiting member for carrying an object. The two engaging structures are respectively fastened to two rail holes of the limiting member. Each engaging structure includes an engaging member and a knob. The engaging member has a threaded portion and a positioning fork respectively arranged on two opposite portions thereof, and the threaded portion at least partially protrudes from the corresponding rail hole. The knob is screwed to the threaded portion, so that the engaging member is movable relative to the limiting member for reducing a distance there-between. The two positioning forks can be detachably inserted into two gaps between two headrest clips and a seat back, respectively.

10 Claims, 10 Drawing Sheets

(56) References Cited

U.S. PATENT DOCUMENTS

| | | | | |
|---|---|---|---|---|
| 2011/0155873 A1* | 6/2011 | Montag | ................... | B60R 11/02 |
| | | | | 248/218.4 |
| 2012/0120626 A1* | 5/2012 | Akaike | ................... | B60R 11/02 |
| | | | | 361/807 |
| 2012/0125959 A1* | 5/2012 | Kucera | ................... | B60N 2/879 |
| | | | | 224/275 |
| 2014/0077539 A1* | 3/2014 | Brawner | ............. | B60R 11/0229 |
| | | | | 297/217.3 |
| 2015/0041508 A1* | 2/2015 | Fan | ........................ | F16M 13/00 |
| | | | | 224/275 |
| 2016/0137140 A1* | 5/2016 | Lee | .......................... | B60N 2/64 |
| | | | | 297/188.05 |
| 2016/0221514 A1* | 8/2016 | Qian | ....................... | B60R 11/02 |
| 2017/0036616 A1* | 2/2017 | Lim | .................... | B60R 11/0235 |
| 2019/0210541 A1* | 7/2019 | Caltabiano | .......... | B60R 11/0235 |
| 2019/0291656 A1* | 9/2019 | Chou | ................... | B60R 11/0235 |
| 2019/0375342 A1* | 12/2019 | Mullen | ................. | B60R 11/0235 |
| 2019/0381951 A1* | 12/2019 | Olar | ........................ | B60R 11/02 |
| 2020/0139896 A1* | 5/2020 | Smith | ................. | B60R 11/0235 |

FOREIGN PATENT DOCUMENTS

| | | | | |
|---|---|---|---|---|
| DE | 102018119865 A1 * | 2/2019 | ............. | B60R 11/02 |
| EP | 1260407 A1 * | 11/2002 | ......... | B60R 11/0235 |
| WO | WO-2008131944 A2 * | 11/2008 | ............. | B60R 7/043 |
| WO | WO-2012160209 A1 * | 11/2012 | ......... | B60R 11/0235 |

\* cited by examiner

US 10,875,464 B1

VEHICLE SEAT AND QUICK-RELEASE SUPPORTING DEVICE THEREOF

FIELD OF THE DISCLOSURE

The present disclosure relates to a supporting device, and more particularly to a vehicle seat and a quick-release supporting device thereof.

BACKGROUND OF THE DISCLOSURE

A conventional supporting device applied to a vehicle seat needs to be passed through by a headrest clip or posts of a headrest for being firmly fixed onto a seat back. However, the above installation of the conventional supporting device to the vehicle seat is not convenient and still has room for improvement.

SUMMARY OF THE DISCLOSURE

In response to the above-referenced technical inadequacies, the present disclosure provides a vehicle seat and a quick-release supporting device thereof to effectively improve the issues associated with conventional supporting devices.

In one aspect, the present disclosure provides a vehicle seat, which includes a seat back, two headrest clips, and a quick-release supporting device. Each of the two headrest clips includes a tubular portion and a head portion that is connected to the tubular portion. The two tubular portions of the two headrest clips are inserted into the seat back and are spaced apart from each other, and the head portion of each of the two headrest clips and the seat back have a gap there-between. The quick-release supporting device is detachably fastened between the seat back and the two head portions of the two headrest clips. The quick-release supporting device includes a limiting member, a carrier, and two engaging structures. The limiting member has two rail holes. The carrier is fastened to the limiting member and is configured to carry an object. The two engaging structures are respectively fastened to the two rail holes of the limiting member. Each of the two engaging structures includes an engaging member and a knob. The engaging member has a threaded portion and a positioning fork respectively arranged on two opposite portions thereof. The threaded portion at least partially protrudes from the corresponding rail hole. The knob and the positioning fork are respectively arranged at two opposite sides of the limiting member, and wherein the knob is screwed to the threaded portion, so that the engaging member is movable relative to the limiting member along a height direction of the engaging structure for reducing a distance between the positioning fork and the limiting member. The positioning forks of the two engaging members of the quick-release supporting device are detachably inserted into the two gaps between the two head portions and the seat back, respectively. In each of the two engaging structures, the knob is configured to be screwed to the threaded portion so as to reduce the distance between the positioning fork and the limiting member until the positioning fork is abutted against the corresponding head portion.

In one aspect, the present disclosure provides a quick-release supporting device of a vehicle seat. The quick-release supporting device includes a limiting member, a carrier, and two engaging structures. The limiting member has two rail holes. The carrier is fastened to the limiting member and is configured to carry an object. The two engaging structures are respectively fastened to the two rail holes of the limiting member. Each of the two engaging structures includes an engaging member and a knob. The engaging member has a threaded portion and a positioning fork respectively arranged on two opposite portions thereof. The threaded portion at least partially protrudes from the corresponding rail hole. The knob and the positioning fork are respectively arranged at two opposite sides of the limiting member. The knob is screwed to the threaded portion, so that the engaging member is movable relative to the limiting member along a height direction of the engaging structure for reducing a distance between the positioning fork and the limiting member. The positioning forks of the two engaging members of the quick-release supporting device are configured to detachably insert into two gaps between two headrest clips and a seat back, respectively. In each of the two engaging structures, the knob is configured to be screwed to the threaded portion so as to reduce the distance between the positioning fork and the limiting member until the positioning fork is abutted against the corresponding head portion.

Therefore, the vehicle seat and the quick-release supporting device of the present disclosure can be used by using the positioning forks of the two engaging members to detachably insert into the two gaps between the two head portions and the seat back, respectively, so that the quick-release supporting device can be quickly installed or released without detaching the headrest clips. Specifically, the installation of the quick-release supporting device does not involve the headrest, so that the headrest can be detached from the back seat at any time.

Moreover, the vehicle seat and the quick-release supporting device of the present disclosure can be used by screwing the knob to the threaded portion for reducing the distance between the positioning fork and the limiting member, so that the positioning fork can be abutted against the corresponding head portion to effectively increase a force of the engaging structure applied to the headrest clip. In other words, the installation of the quick-release supporting device does not require the use of any tool, so that a user can quickly install or release the quick-release supporting device to or from the back seat.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
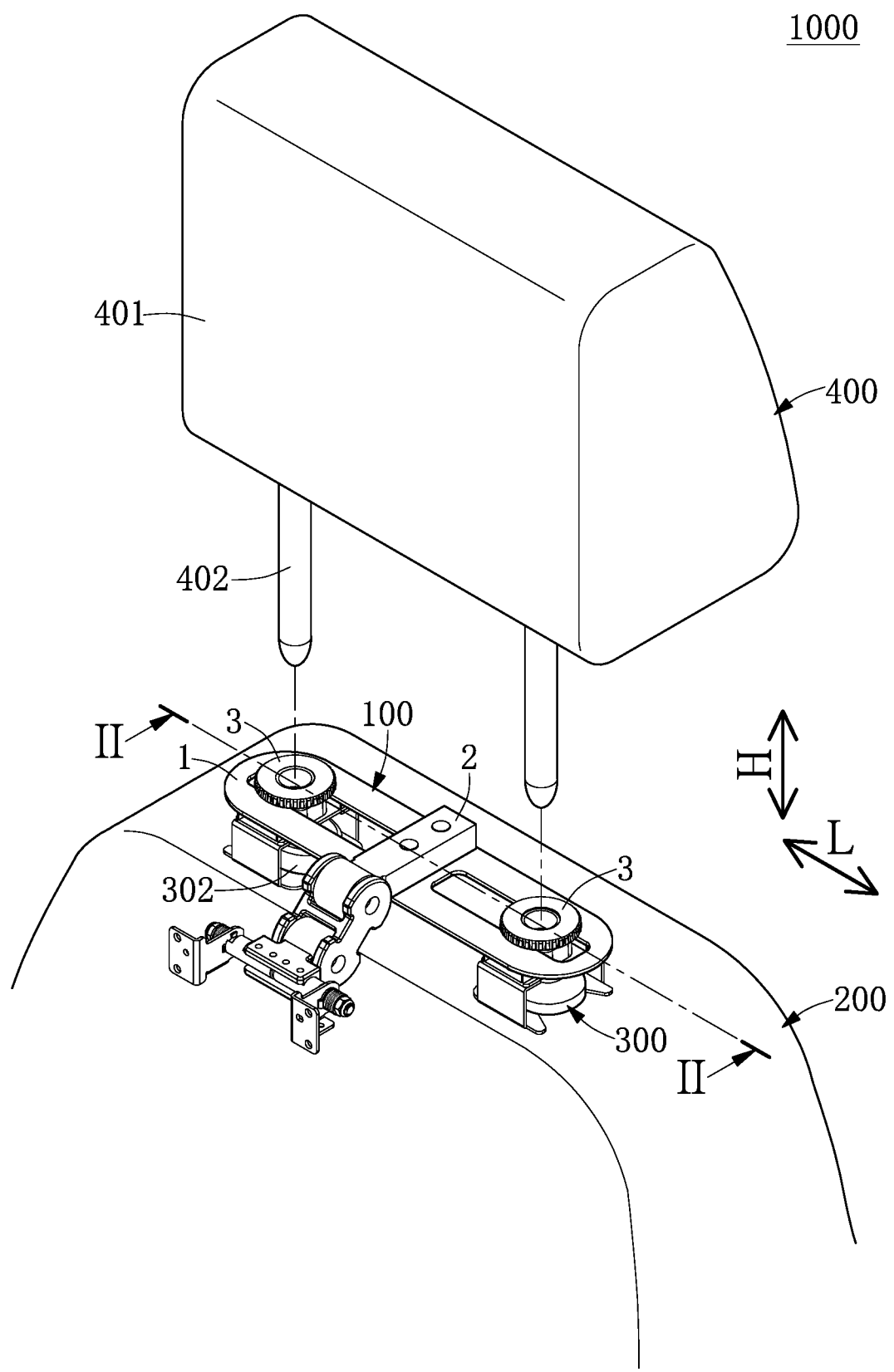
FIG. 1 is a perspective view of a vehicle seat according to the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
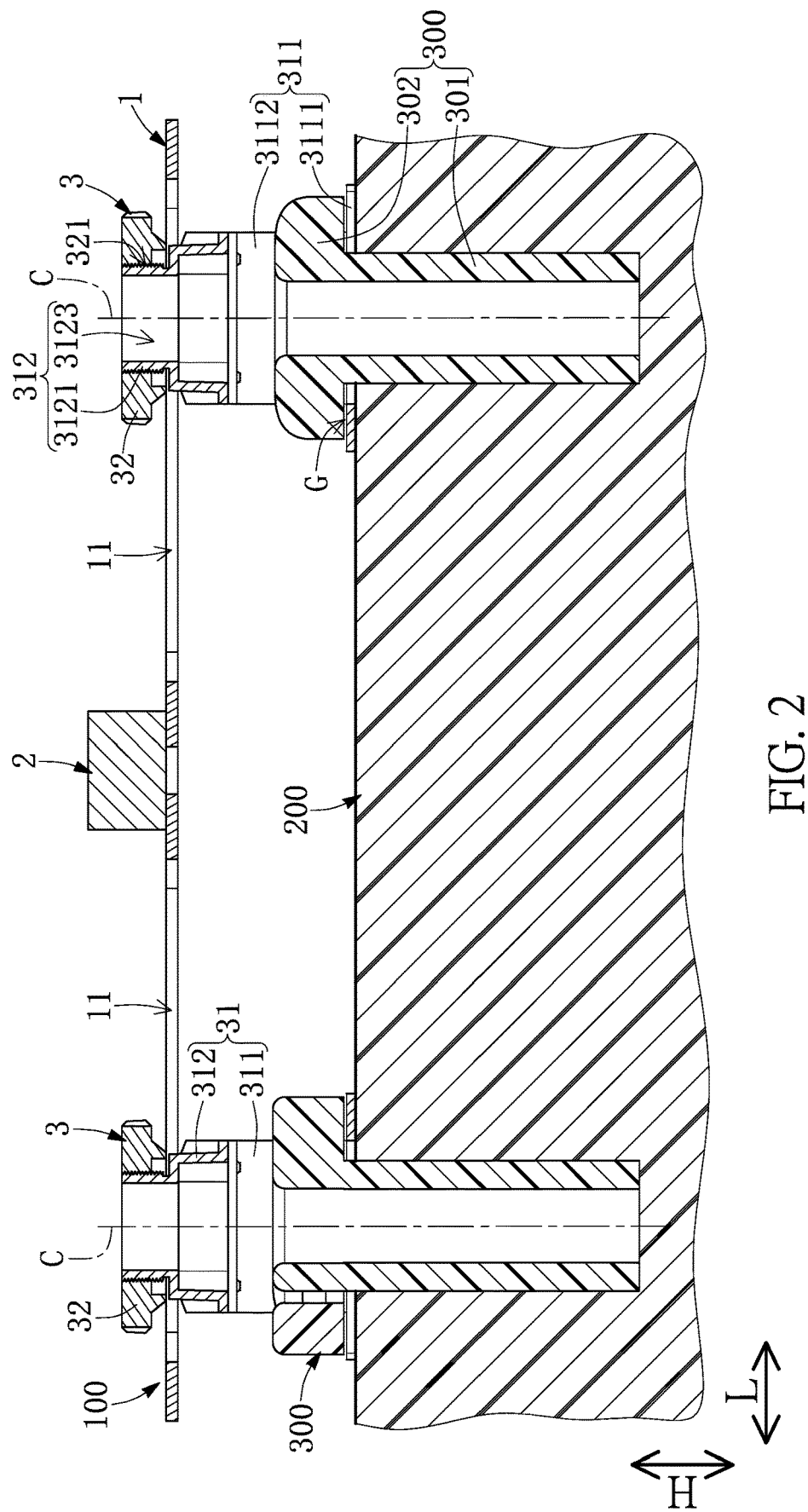
FIG. 2 is a cross-sectional view taken along line II-II of FIG. 1.
Figure 3:
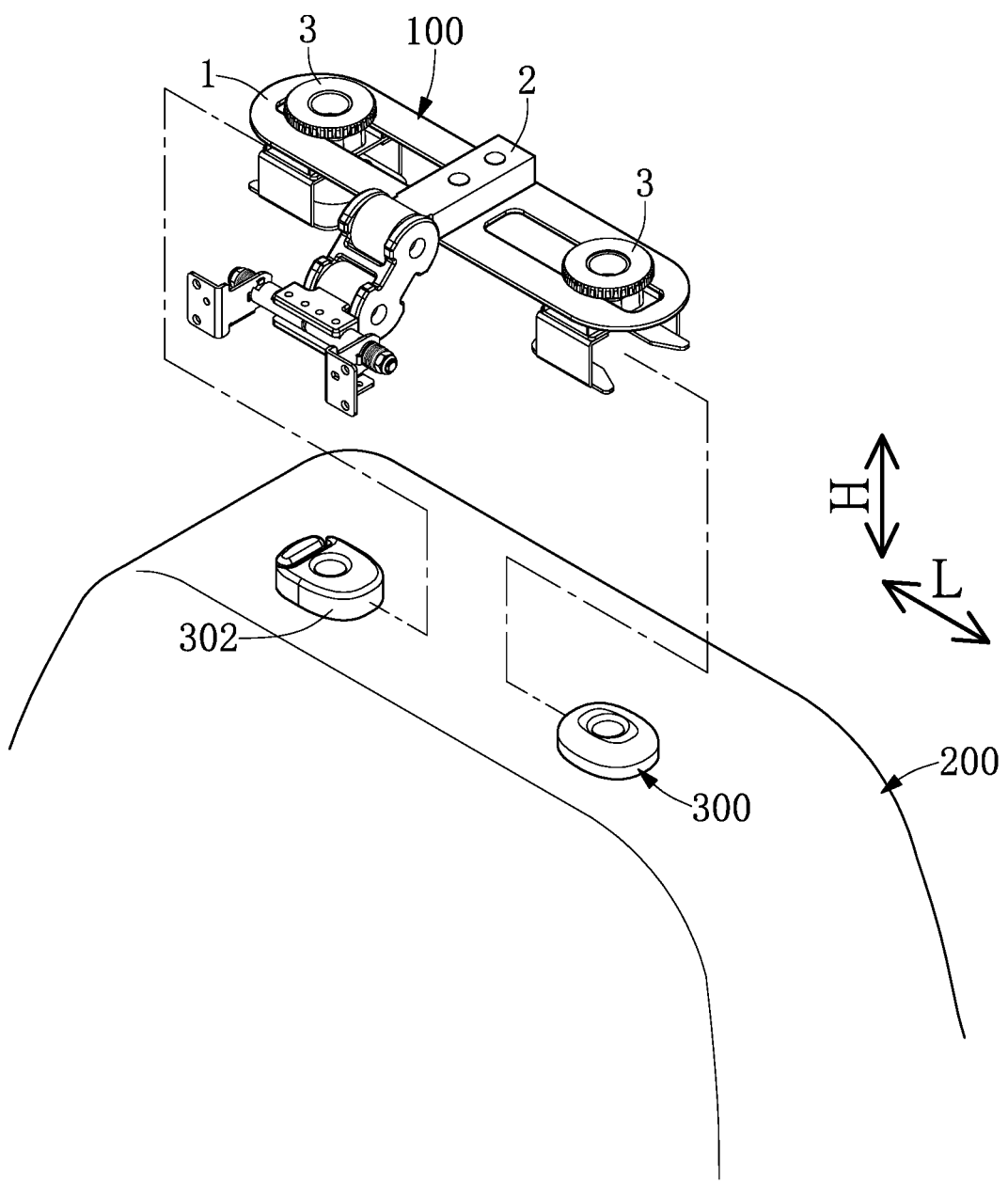
FIG. 3 is an exploded view of FIG. 1 when a headrest is omitted.

Referring to FIG. 1 to FIG. 10, an embodiment of the present disclosure provides a vehicle seat 1000. As shown in FIG. 1 to FIG. 3, the vehicle seat 1000 includes a seat back 200, two headrest clips 300 fastened to the seat back 200, a quick-release supporting device 100 detachably fastened between the seat back 200 and the two headrest clips 300, and a headrest 400 inserted into the two headrest clips 300 and the quick-release supporting device 100.

Each of the two headrest clips 300 includes a tubular portion 301 and a head portion 302 connected to the tubular portion 301. The two tubular portions 301 of the two headrest clips 300 are inserted into the seat back 200 and are spaced apart from each other, and the head portion 302 of each of the two headrest clips 300 and the seat back 200 have a gap G there-between. The headrest 400 includes a pillow portion 401 and two posts 402 fixed to the pillow portion 401, and a distance between the two posts 402 is substantially equal to a distance between the two tubular portions 301.

It should be noted that the quick-release supporting device 100 in the present embodiment is described as being applied to the vehicle seat 1000, but the present disclosure is not limited thereto. For example, in other embodiments of the present disclosure, the quick-release supporting device 100 can be independently used (e.g., sold). The following description describes the structure and connection relationship of each component of the quick-release supporting device 100.

Figure 4:
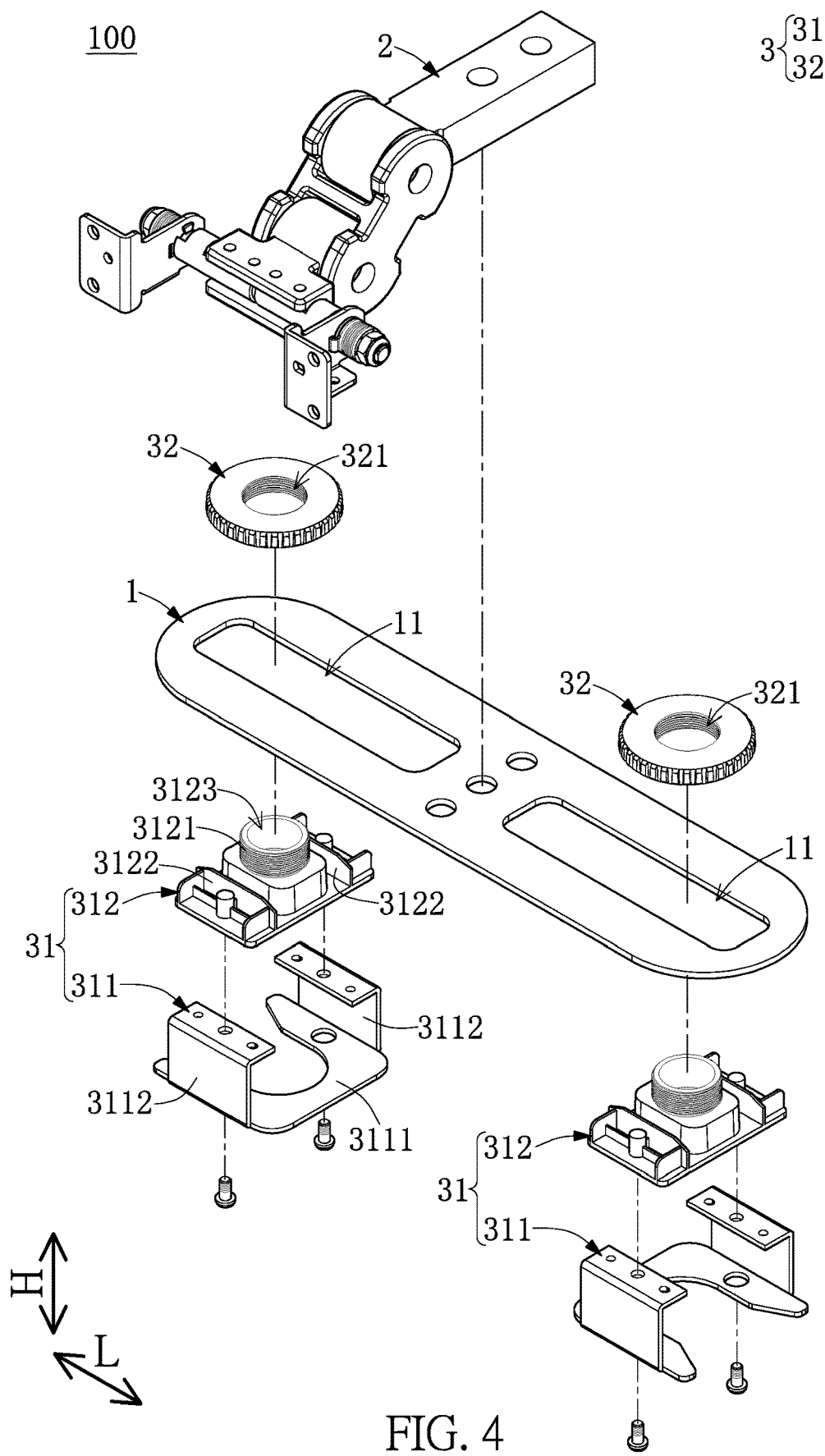
FIG. 4 is an exploded view of a quick-release supporting device according to the present disclosure.
Figure 5:
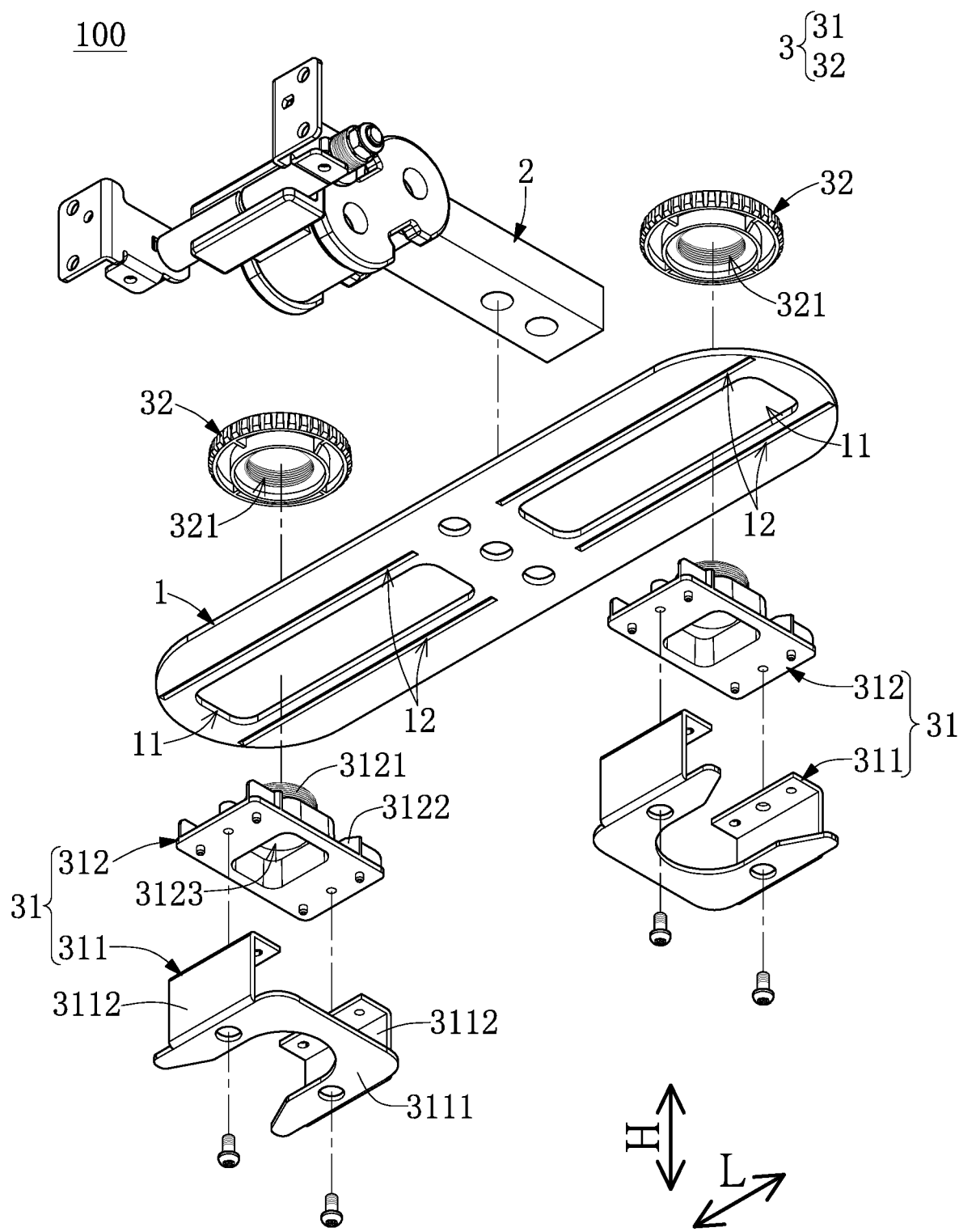
FIG. 5 is an exploded view of a quick-release supporting device from another view angle according to the present disclosure.

As shown in FIG. 2, FIG. 4 and FIG. 5, the quick-release supporting device 100 includes a limiting member 1, a carrier 2, and two engaging structures 3. In the present embodiment, the limiting member 1 is an elongated plate, and has two rail holes 11 that are preferably arranged along a transverse direction L (i.e., a longitudinal direction of the limiting member 1) and are spaced apart from each other. Moreover, the limiting member 1 has four rail grooves 12, and two of the four rail grooves 12 are arranged at two opposite sides of one of the two rail holes 11, and another two of the four rail grooves are arranged at two opposite sides of another one of the two rail holes 11. Each of the rail grooves 12 in the present embodiment is recessed in a bottom surface of the limiting member 1, and is parallel to the transverse direction L, but the present disclosure is not limited thereto. For example, in other embodiments of the present disclosure, the rail groove 12 can be formed to be penetrated through the limiting member 1.

The carrier 2 is fastened to the limiting member 1 for carrying an object (e.g., a display). The carrier 2 in the present embodiment can include a hinge structure that is fastened to a portion of the limiting member 1 between the two rail holes 11. Moreover, the carrier 2 in the present embodiment is fixed to the limiting member 1 in a screwing manner, but the present disclosure is not limited thereto.

The two engaging structures 3 are respectively fastened to the two rail holes 11 of the limiting member 1. As the two engaging structures 3 are essentially of the same structure, the following description discloses the structure of just one of the two engaging structures 3 for the sake of brevity.

The engaging structure 3 includes an engaging member 31 and a knob 32 fastened to the engaging member 31. The engaging member 31 includes a threaded portion 3121 and a positioning fork 3111 respectively arranged on two opposite portions thereof. The threaded portion 3121 in the present embodiment has a tubular shape having a first circular hole 3123, and at least partially protrudes from the corresponding rail hole 11. The positioning fork 3111 in the present embodiment is a U-shaped sheet.

It should be noted that the engaging member 31 can be integrally formed as a one-piece structure, or can be formed by assembling a plurality of pieces. The engaging member 31 in the present embodiment is formed by assembling two pieces, but the present disclosure is not limited thereto. Specifically, the engaging member 31 includes a bottom stand 311 and a top stand 312 fixed on the bottom stand 311.

The bottom stand 311 in the present embodiment is integrally formed by bending a metal sheet, and includes the positioning fork 3111 and two supporting arms 3112 extending from outer edges of the positioning fork 3111. The two supporting arms 3112 are preferably perpendicularly connected to two opposite outer lateral edges of the positioning fork 3111. In other words, the two supporting arms 3112 face toward each other.

The top stand 312 is fixed onto the two supporting arms 3112 of the bottom stand 311, and is abutted against the limiting member 1. The top stand 312 includes the threaded portion 3121 arranged on one side thereof distant from the positioning fork 3111 and two sliding strips 3122 respectively arranged at two opposite sides of the threaded portion 3121. The two sliding strips 3122 of the top stand 312 are slidably arranged in the two rail grooves 12 adjacent to the corresponding rail hole 11, respectively.

In addition, in other embodiments of the present disclosure, the bottom stand 311 can include the positioning fork 3111 and at least one supporting arm 3112 extending from an outer edge of the positioning fork 3111. In other words, the bottom stand 311 in the present disclosure can include at least one supporting arm 3112, and the top stand 312 is fixed onto the at least one supporting arm 3112.

The knob 32 and the positioning fork 3111 (or the bottom stand 311) of the engaging member 31 are respectively arranged at two opposite sides of the limiting member 1. An outer diameter of the knob 32 is greater than a width of the corresponding rail hole 11, and the knob 32 is screwed to the threaded portion 3121 of the engaging member 31, so that the engaging member 31 is movable relative to the limiting member 1 along a height direction H of the engaging structure 3 for reducing a distance between the positioning fork 3111 and the limiting member 1. In other words, the positioning fork 3111 of the engaging member 31 can be moved relatively toward the limiting member 1 by screwing the knob 32 to the threaded portion 3121. It should be noted that the height direction H in the present embodiment is perpendicular to the transverse direction L, and is parallel to a longitudinal direction of any one of the two engaging structures 3.

Specifically, the knob 32 in the present embodiment has an annular shape having a second circular hole 321, and the threaded portion 3121 is partially arranged in the second circular hole 321 of the knob 32. Moreover, the knob 32 is detachably screwed to the threaded portion 3121 of the corresponding engaging member 31, so that the engaging structures 3 is detachable from the limiting member 1, but the present disclosure is not limited thereto. For example, in other embodiments of the present disclosure, the knob 32 can be provided as being inseparable from the corresponding threaded portion 3121, and thereby avoid losing the knob 32.

The engaging structure 3 of the present embodiment has been described in the above description, and the relationship between the two engaging structures 3 and the other components of the vehicle seat 1000. The positioning forks 3111 of the two engaging members 31 of the quick-release supporting device 100 are detachably inserted into the two gaps G between the two head portions 302 and the seat back 200, respectively.

In each of the two engaging structures 3, the knob 32 is configured to be screwed to the threaded portion 3121 so as to reduce the distance between the positioning fork 3111 of the engaging member 31 and the limiting member 1 until the positioning fork 3111 is abutted against the corresponding head portion 302. Specifically, the positioning fork 3111 and the at least one supporting arm 3112 are arranged outside of the corresponding head portion 302. In other words, the head portion 302 is arranged in a space that is surroundingly defined by the positioning fork 3111 and the at least one supporting arm 3112, and the positioning fork 3111 is abutted against a bottom side of the head portion 302.

It should be noted that the positioning fork 3111 of the present embodiment can be abutted against at least 60% of the area of the bottom side of the head portion 302 by the cooperation of the knob 32 and the threaded portion 3121, thereby effectively increasing a force of the engaging structure 3 applied to the headrest clip 300.

Specifically, in each of the two engaging structures 3, a center of the first circular hole 3123 of the threaded portion 3121 and a center of the second circular hole 321 of the knob 32 are located at a central axis C of the tubular portion 301 of the corresponding headrest clip 300, so that one of the posts 402 can be inserted into the tubular portion 301 of the corresponding headrest clip 300. In other words, the two posts 402 are respectively inserted into the tubular portions 301 of the two headrest clips 300 by detachably passing through the two engaging structures 3, respectively.

It should be noted that each of the two engaging structures 3 in the present embodiment is rotatable around an axis defined by the height direction H relative to the limiting member 1, so that the positioning forks 3111 of the two engaging structures 3 are configured to respectively insert into the two gaps G along two different directions, but the present disclosure is not limited thereto.

Figure 6:
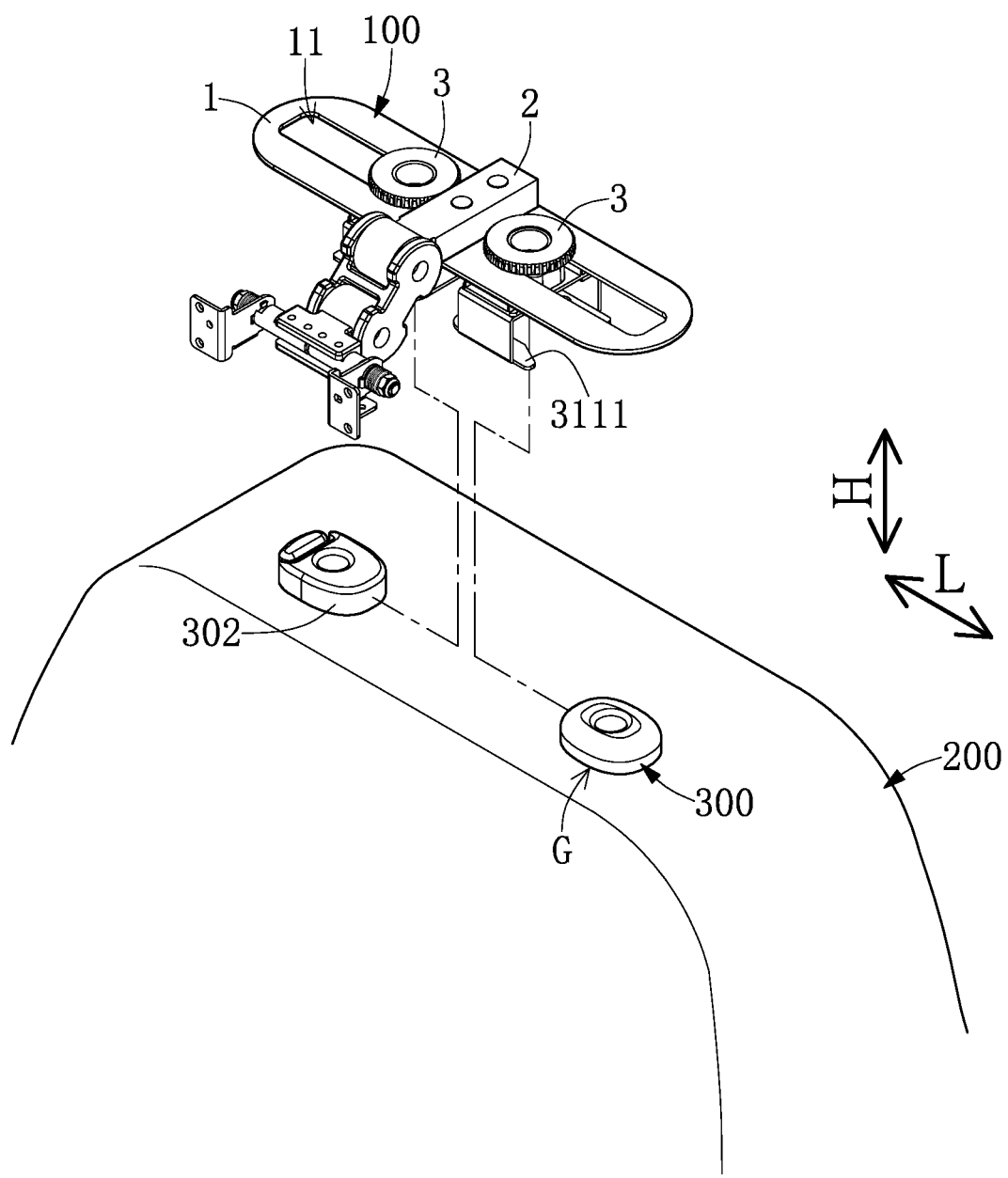
FIG. 6 to FIG. 8 are schematic views showing a first assembling process of the quick-release supporting device according to the present disclosure.
Figure 7:
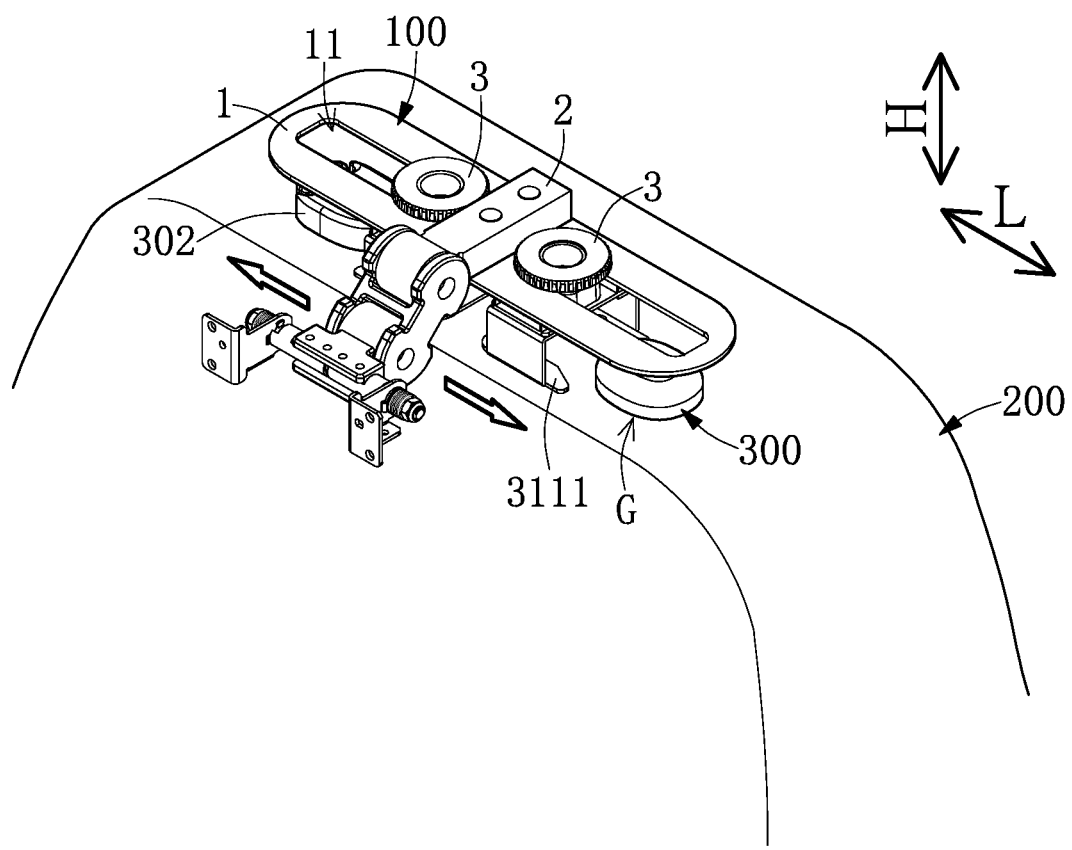
Figure 8:
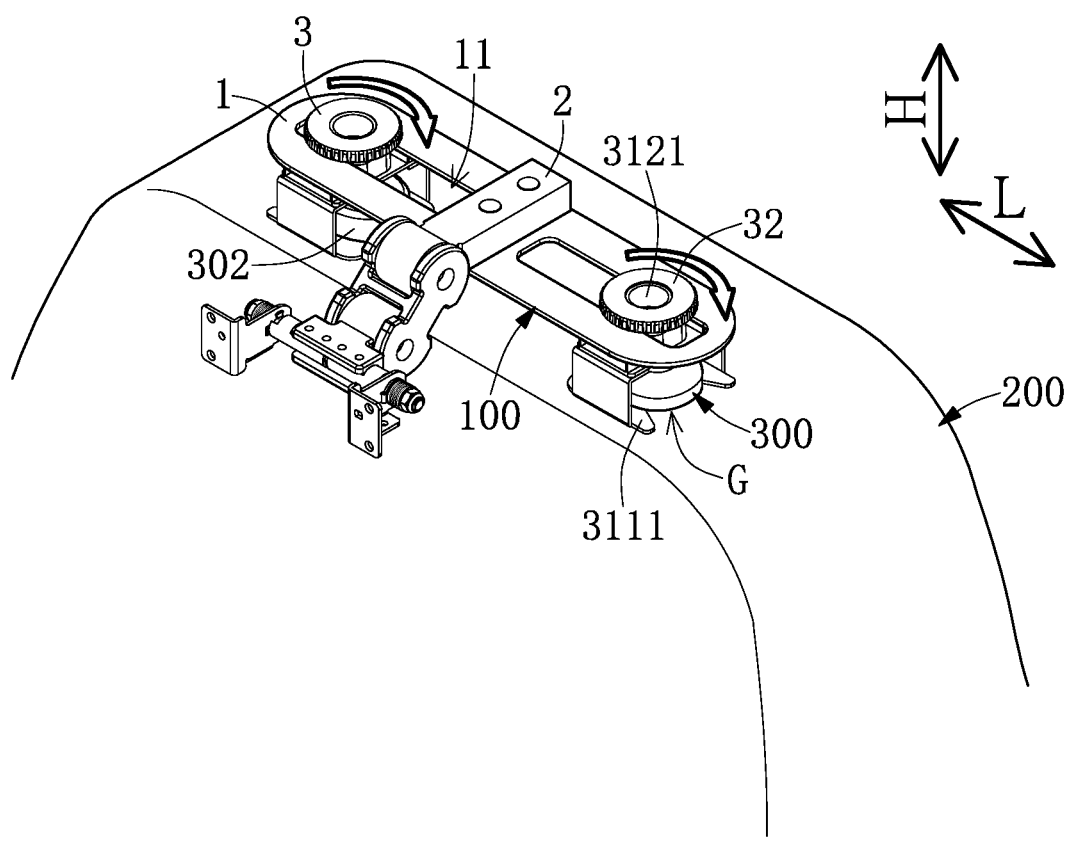
Figure 9:
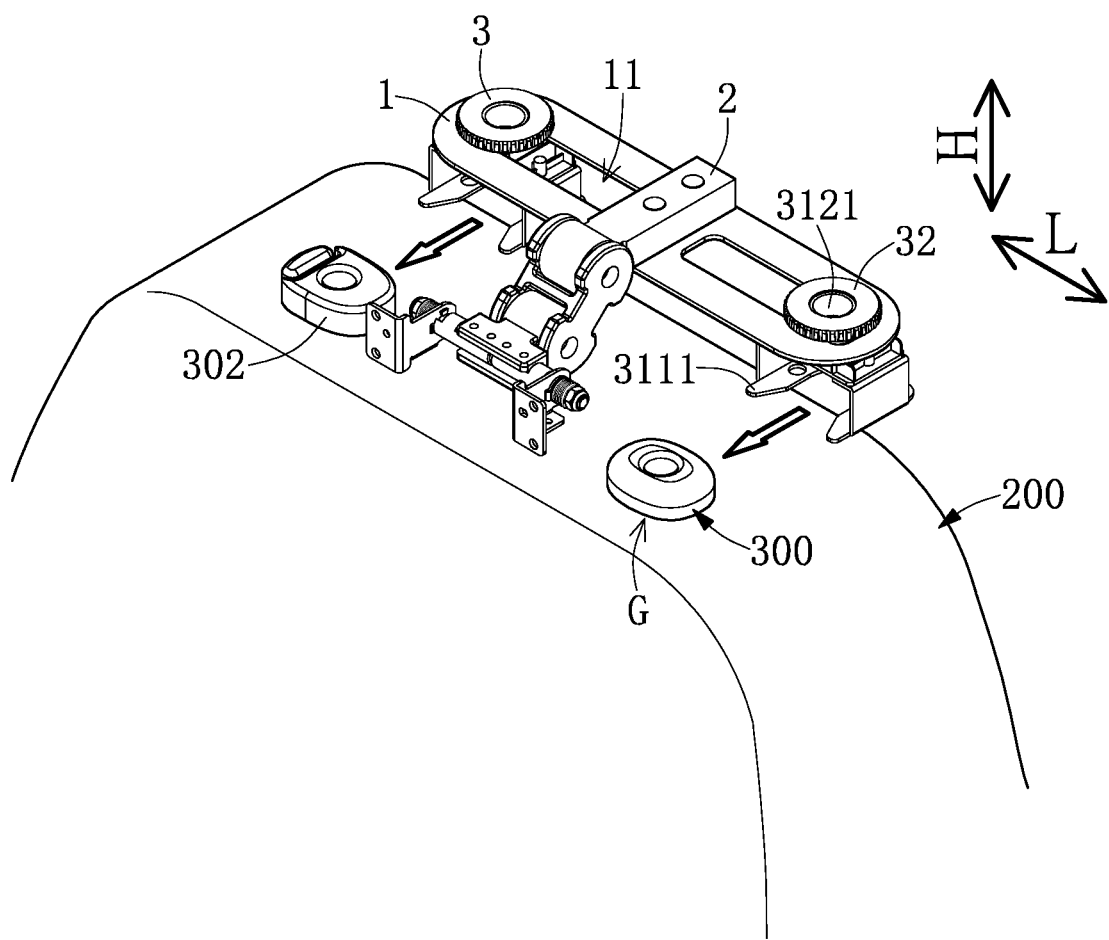
FIG. 9 is a schematic view showing a second assembling process of the quick-release supporting device according to the present disclosure.
Figure 10:
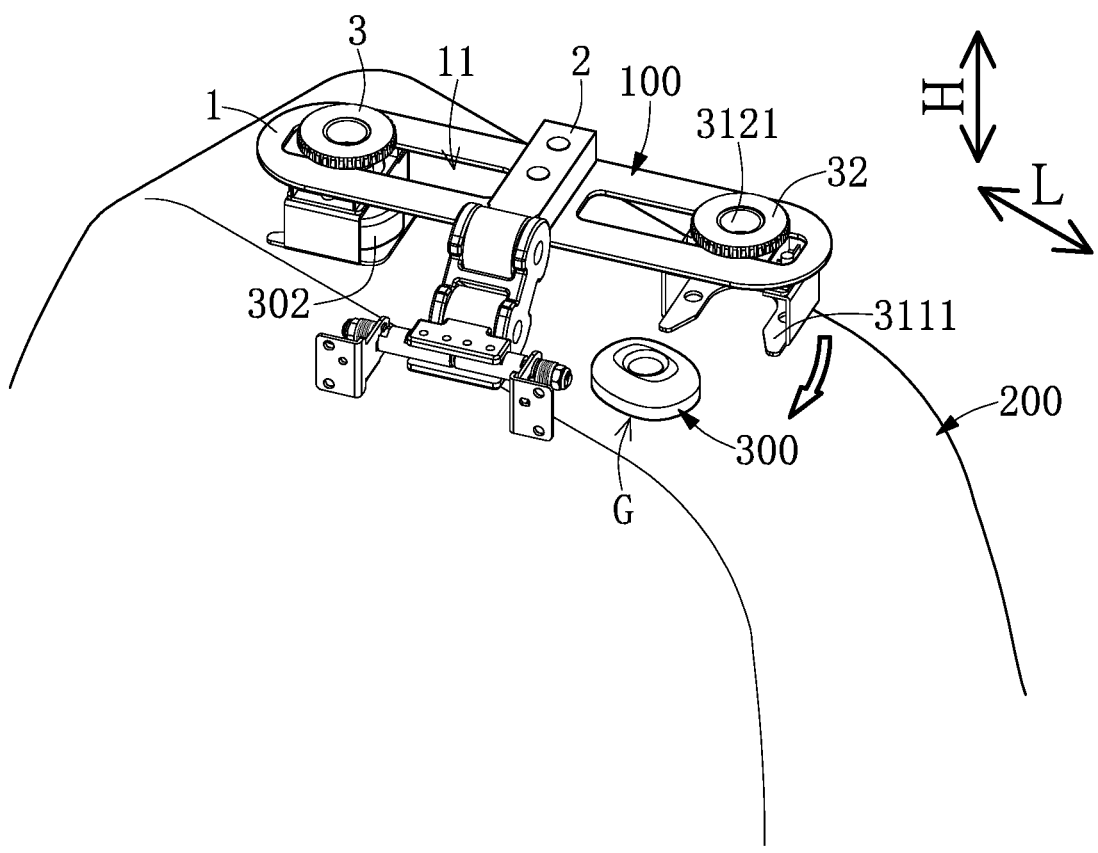
FIG. 10 is a schematic view showing a third assembling process of the quick-release supporting device according to the present disclosure.

For example, as shown in FIG. 6 to FIG. 8, the positioning forks 3111 of the two engaging structures 3 can be oriented in two opposite directions, so that the two positioning forks 3111 can be disposed between the two headrest clips 300 and respectively inserted into the two gaps G. As shown in FIG. 10, the positioning forks 3111 of the two engaging structures 3 can be at ninety degrees with respect to each other, so that one of the two positioning forks 3111 can be used to insert into one of the two gaps G, and then the other one of the two positioning forks 3111 can be used to insert into the other one of the two gaps G by rotating the limiting member 1. In addition, as shown in FIG. 9, the positioning forks 3111 of the two engaging structures 3 can be oriented in the same direction, so that the two positioning forks 3111 can be used to respectively insert into the two gaps G at the same time.

In conclusion, the vehicle seat and the quick-release supporting device of the present disclosure can be used by using the positioning forks of the two engaging members to detachably insert into the two gaps between the two head portions and the seat back, respectively, so that the quick-release supporting device can be quickly installed or released without detaching the headrest clips. Specifically, the installation of the quick-release supporting device does not involve the headrest, so that the headrest can be detached from the back seat at any time.

Moreover, the vehicle seat and the quick-release supporting device of the present disclosure can be used by screwing the knob to the threaded portion for reducing the distance between the positioning fork and the limiting member, so that the positioning fork can be abutted against the corresponding head portion to effectively increase a force of the engaging structure applied to the headrest clip. In other words, the installation of the quick-release supporting device does not need to use any tool, so that a user can quickly install or release the quick-release supporting device to and from the back seat.

In addition, the positioning forks of the two engaging structures can be oriented in the same direction, so that the two positioning forks can be used to respectively insert into the two gaps at the same time; or the positioning forks of the two engaging structures can be oriented in two different directions, so that the two positioning forks can be used to respectively insert into the two gaps along two different directions. Accordingly, the quick-release supporting device of the present disclosure is provided with different manners of installation for different types of back seats.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A vehicle seat, comprising:
   a seat back;
   two headrest clips each including a tubular portion and a head portion that is connected to the tubular portion, wherein the two tubular portions of the two headrest clips are inserted into the seat back and are spaced apart from each other, and the head portion of each of the two headrest clips and the seat back have a gap therebetween; and
   a quick-release supporting device detachably fastened between the seat back and the two head portions of the two headrest clips, wherein the quick-release supporting device includes:
      a limiting member having two rail holes;
      a carrier fastened to the limiting member and configured to carry an object; and
      two engaging structures respectively fastened to the two rail holes of the limiting member, wherein each of the two engaging structures includes:
         an engaging member having a threaded portion and a positioning fork respectively arranged on two opposite portions thereof, wherein the threaded portion at least partially protrudes from the corresponding rail hole; and
         a knob, wherein the knob and the positioning fork are respectively arranged at two opposite sides of the limiting member, and wherein the knob is screwed to the threaded portion, so that the engaging member is movable relative to the limiting member along a height direction of the engaging structure for reducing a distance between the positioning fork and the limiting member,
   wherein the positioning forks of the two engaging members of the quick-release supporting device are detachably inserted into the two gaps between the two head portions and the seat back, respectively, and wherein in each of the two engaging structures, the knob is configured to be screwed to the threaded portion so as to reduce the distance between the positioning fork and the limiting member until the positioning fork is abutted against the corresponding head portion.

2. The vehicle seat according to claim 1, wherein each of the two knobs is detachably screwed to the threaded portion of the corresponding engaging member, so that each of the two engaging structures is detachable from the limiting member.

3. The vehicle seat according to claim 1, wherein each of the two engaging structures is rotatable around an axis defined by the height direction relative to the limiting member, so that the positioning forks of the two engaging structures are configured to respectively insert into the two gaps along two different directions.

4. The vehicle seat according to claim 1, wherein each of the two engaging members includes:
   a bottom stand including the positioning fork and at least one supporting arm extending from an outer edge of the positioning fork, wherein the positioning fork and the at least one supporting arm are arranged outside of the corresponding head portion; and
   a top stand fixed onto the at least one supporting arm and abutted against the limiting member, wherein the top stand includes the threaded portion arranged on one side thereof that is distant from the positioning fork.

5. The vehicle seat according to claim 4, wherein each of the two positioning forks is a U-shaped sheet, and the two positioning forks are configured to respectively insert into the two gaps along two different directions.

6. The vehicle seat according to claim 4, wherein the limiting member has four rail grooves, two of the four rail grooves are arranged at two opposite sides of one of the two rail holes, and another two of the four rail grooves are arranged at two opposite sides of another one of the two rail holes, each of the two top stands includes two sliding strips respectively arranged at two opposite sides of the threaded portion thereof, and the two sliding strips of each of the two top stands are slidably arranged in the two rail grooves adjacent to the corresponding rail hole, respectively.

7. The vehicle seat according to claim 1, wherein the two rail holes of the limiting member are spaced apart from each other along a transverse direction that is perpendicular to the height direction, and the carrier is fastened to a portion of the limiting member between the two rail holes.

8. The vehicle seat according to claim 1, wherein in each of the two engaging structures, the threaded portion of the engaging member has a first circular hole, the knob has a second circular hole, and a center of the first circular hole and a center of the second circular hole are located at a central axis of the tubular portion of the corresponding headrest clip.

9. The vehicle seat according to claim 1, further comprising a headrest, wherein the headrest includes two posts, and the two posts are respectively detachably inserted into the tubular portions of the two headrest clips by passing through the two engaging structures, respectively.

10. A quick-release supporting device of a vehicle seat, comprising:
   a limiting member having two rail holes;
   a carrier fastened to the limiting member and configured to carry an object; and
   two engaging structures respectively fastened to the two rail holes of the limiting member, wherein each of the two engaging structures includes:
      an engaging member having a threaded portion and a positioning fork respectively arranged on two opposite portions thereof, wherein the threaded portion at least partially protrudes from the corresponding rail hole; and
      a knob, wherein the knob and the positioning fork are respectively arranged at two opposite sides of the limiting member, and wherein the knob is screwed to the threaded portion, so that the engaging member is movable relative to the limiting member along a height direction of the engaging structure for reducing a distance between the positioning fork and the limiting member,
   wherein the positioning forks of the two engaging members of the quick-release supporting device are configured to detachably insert into two gaps between two headrest clips and a seat back, respectively, and wherein in each of the two engaging structures, the knob is configured to be screwed to the threaded portion so as to reduce the distance between the positioning fork and the limiting member until the positioning fork is abutted against the corresponding head portion.

* * * * *